US012600874B2

(12) United States Patent
Wolf et al.

(10) Patent No.: US 12,600,874 B2
(45) Date of Patent: Apr. 14, 2026

(54) AQUEOUS PIGMENTED INK

(71) Applicant: SCHWAN-STABILO COSMETICS GMBH & CO. KG, Heroldsberg (DE)

(72) Inventors: Lukas Wolf, Weidenberg (DE); Julia Scharschinger, Wiesenttal (DE); Ingolf Kahle, Rückersdorf (DE)

(73) Assignee: Schwan-Stabilo Cosmetics GmbH & Co. KG, Heroldsberg (DE)

( * ) Notice: Subject to any disclaimer, the term of this patent is extended or adjusted under 35 U.S.C. 154(b) by 794 days.

(21) Appl. No.: 17/433,229

(22) PCT Filed: Feb. 27, 2020

(86) PCT No.: PCT/EP2020/055185
§ 371 (c)(1),
(2) Date: Aug. 23, 2021

(87) PCT Pub. No.: WO2020/174061
PCT Pub. Date: Sep. 3, 2020

(65) Prior Publication Data
US 2022/0135816 A1 May 5, 2022

(30) Foreign Application Priority Data
Feb. 27, 2019 (DE) ..................... 20 2019 101 134.3

(51) Int. Cl.
| | |
|---|---|
| *C09D 11/17* | (2014.01) |
| *A45D 34/00* | (2006.01) |
| *A45D 34/04* | (2006.01) |
| *B43K 8/02* | (2006.01) |

(52) U.S. Cl.
CPC .............. *C09D 11/17* (2013.01); *A45D 34/04* (2013.01); *B43K 8/026* (2013.01); *A45D 2034/005* (2013.01)

(58) Field of Classification Search
None
See application file for complete search history.

(56) References Cited

U.S. PATENT DOCUMENTS

| | | | |
|---|---|---|---|
| 8,048,920 B2 | 11/2011 | Joerger et al. | |
| 10,589,133 B2 | 3/2020 | Lebok et al. | |

| | | | | |
|---|---|---|---|---|
| 2003/0185780 | A1* | 10/2003 | Ferrari | ..................... A61Q 1/06 424/70.11 |
| 2006/0173094 | A1 | 8/2006 | Ikoma et al. | |
| 2008/0292570 | A1 | 11/2008 | Bauer et al. | |
| 2010/0161029 | A1 | 6/2010 | Filippini et al. | |
| 2010/0232865 | A1 | 9/2010 | Kitaoka | |
| 2010/0240772 | A1 | 9/2010 | Koplin et al. | |
| 2012/0244202 | A1 | 9/2012 | Simonnet et al. | |
| 2016/0011506 | A1 | 1/2016 | Gu et al. | |
| 2016/0215212 | A1 | 7/2016 | Lee et al. | |
| 2017/0240745 | A1 | 8/2017 | Schoen et al. | |
| 2017/0290750 | A1 | 10/2017 | Hamm et al. | |

FOREIGN PATENT DOCUMENTS

| | | | |
|---|---|---|---|
| CN | 1327418 | A | 12/2001 |
| DE | 3725600 | A1 | 2/1989 |
| DE | 602004013358 | T2 | 7/2009 |
| DE | 102011121829 | A1 | 6/2013 |
| DE | 102016214617 | A1 | 2/2018 |
| JP | 2005187397 | | 7/2005 |
| JP | 2013040106 | | 2/2013 |
| KR | 1020100057875 | A | 6/2010 |
| KR | 1020170099369 | A | 8/2017 |
| KR | 1020170116582 | A | 10/2017 |
| WO | 0181484 | A2 | 11/2001 |
| WO | 2008145258 | A1 | 4/2008 |
| WO | 2011095331 | A2 | 11/2011 |
| WO | 2012013323 | A1 | 2/2012 |

OTHER PUBLICATIONS

Machine translation of J P 2005-187397 (Year: 2005).*
Datasheet for SYMPHOLIGHT.*
European Patent Office, International Search Report for International Application No. PCT/EP2020/055185, May 6, 2020.
European Patent Office, Written Opinion of the International Searching Authority for International Application No. PCT/EP2020/055185, Oct. 9, 2019.

* cited by examiner

*Primary Examiner* — Robert T Butcher
(74) *Attorney, Agent, or Firm* — Bradley Arant Boult Cummings LLP

(57) ABSTRACT

An aqueous pigmented ink for use in a capillary reservoir system comprises at least one pigment, at least one water-dispersible, film-forming component, about 0.5 to about 4.5 wt % of at least one suspension substance and about 0.01 to about 0.5 wt % of a gel former combination in an aqueous vehicle, the gel former combination comprising at least one mineral gel former and at least one organic thickener.

17 Claims, 1 Drawing Sheet

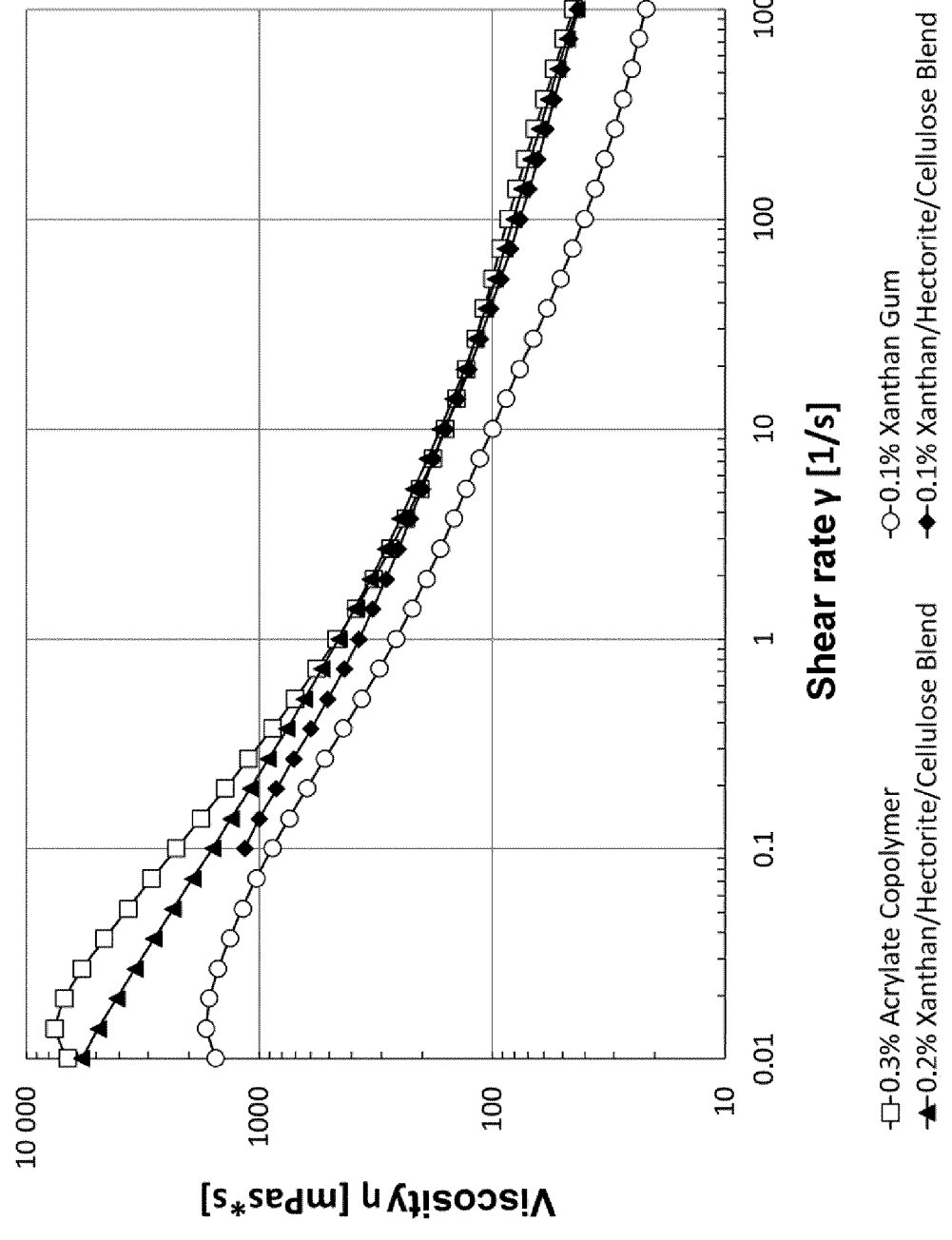

AQUEOUS PIGMENTED INK

The invention relates to an aqueous pigmented ink which can be used in a pen based on capillary reservoir system.

Water-based, pigment-containing inks have been known for a very long time and for diverse applications. Inks are used to produce a permanent line or a pattern on a substrate. In order to obtain an opaque layer of colour on a substrate, pigments must be used, since soluble dyes in general suffer fading, let the background show through, alter the shade, and are altered in particular by light and temperature. Pigments is the term for inorganic or organic, chromatic or achromatic colourants which are virtually insoluble in the medium of use. Pigments can be used in various particle sizes. In each case there is a dispersion system wherein virtually insoluble pigment particles are dispersed in an aqueous vehicle. Systems of this kind are also referred to as a suspension. Since the density of pigment particles is generally greater than that of the water typically used as vehicle material, they readily settle and form agglomerates in the reservoir vessel. In order to maintain pigments in fine dispersion, it is known practice to use surfactants. Surfactants are able to hold very small, finely divided particles in suspension for a long time and to at least slow down sedimentation. After a certain time, however, sedimentation does occur, and may ultimately lead to inhomogeneities. With pigment dispersions which as such are used directly, this is often not a great problem, since the homogeneous dispersion can be re-established by shaking. For an ink which is to be used in a capillary reservoir system, however, it is unacceptable, since sedimentation causes clogging of the reservoir system and/or because only the liquid constituents of the unsedimented material are conveyed into the system.

The problem of sedimentation affects even small, finely divided particles. The problem is exacerbated if pigments known as effect pigments are added to an ink. Effect pigments are generally relatively large particles, taking the form of flakes, beads, layered silicates, etc. In order to prevent sedimentation of such particles in an aqueous vehicle, surfactants are no longer enough. Moreover, the shape and size of the effect pigments cannot be modified without detriment to the effect, meaning that these kinds of pigments cannot be comminuted by processes of milling.

In order to maintain relatively large-particle pigments such as effect pigments in suspension over the long term, it is known practice to add suspension substances. These are optionally very finely divided particles having a relatively low density, which in a suspension do not form sediment and are able to intercept partially the settling of larger effect pigments. Known suspension substances are cellulose particles, namely particles of insoluble cellulose; silicon dioxides, such as silica; and non-soluble starch derivatives or cellulose derivatives.

It has been found, however, that the known suspension substances often only slow down the process of sedimentation, without truly preventing it. Moreover, particularly at relatively high concentrations as required to hold up the process of sedimentation, they frequently increase the viscosity of the dispersion very significantly, meaning that the ink is no longer able to flow, or flow sufficiently, through the capillary reservoir system.

Additionally, attempts have been made to influence the sedimentation of pigments, especially effect pigments, by means of rheological additives. Contemplated here in particular are gel formers, these being compounds which through specific interactions with a solvent system, for example an aqueous system, form a gel. This gel, which has a kind of network structure, is able to maintain pigments in suspension and hinder their settlement, or at least reduce and retard settlement. Known rheological additives are polymer chains of high molecular weight, which thicken the system through interlooping of the water-soluble polymer chains. The efficacy of the thickener is determined in particular by the molecular weight of the polymer. The higher the molecular weight, the more effective the thickener. However, a high molecular weight on the part of a polymeric thickener leads to problems of compatibility, may cause flocculation of constituents, and may generate unwanted interactions with film formers. The network structure here may be generated either by the rheological additives alone or else in combination with other ingredients, such as film formers, for example.

Despite, therefore, the many previous attempts to provide an ink which not only has a sufficiently low viscosity to be able to be used in a capillary reservoir system but also has sufficient dispersing properties to keep particulate materials dispersed, a good solution has not yet hitherto been found.

It was therefore an object of the present invention to provide an ink with sufficient dispersing capacity to stabilize pigments, including effect pigments, in a suspension, while at the same time having sufficient fluidity to prevent the clogging of capillaries, this ink also remaining stable to settling and nevertheless fluid even over a relatively long period and at relatively high temperatures. Furthermore, the additives used for the stabilization are to meet all of the requirements necessary for use in cosmetic products and everyday articles—meaning ingredients which are not toxic, do not irritate the skin, and also do not give rise to any other adverse qualities when used on the human body. An object of the present invention, furthermore, was to provide an ink which can be applied easily and reproducibly from a capillary system to surfaces and in particular to skin.

All of these objects are achieved with an aqueous pigmented ink as defined in the claims of the present patent application.

The invention provides an aqueous pigmented ink for use in a capillary reservoir system, which comprises at least one pigment, at least one water-dispersible, film-forming component, about 0.5 to about 4.5 wt % of at least one suspension substance and about 0.01 to about 0.5 wt % of a gel former combination in an aqueous vehicle, the gel former combination comprising at least one mineral gel former and at least one organic thickener.

It has surprisingly been found that a combination of the kind claimed, its components including at least one suspension substance and at least two gel formers, is able to maintain pigments durably in dispersion, including relatively large particles, such as glass flakes, pearl pigments and other effect pigments. Without being tied to a theory, it is assumed that the combination of at least two gel formers and at least one suspension substance forms a structure which is such that even relatively large particles can be durably held therein, this combination at the same time having sufficient compatibility with the surface of the capillary reservoir system in which the ink is used, so that the ink can easily flow through, without filter effects, retention effects or other unwanted effects occurring.

Having shown themselves to be highly suitable are gel former combinations which comprise at least two different gel formers, selected from the group of swellable layered silicate on the one hand and from the group of polysaccharide having thickening properties, on the other hand. Further gel formers may be added, as set out below. Without being tied to a theory, it is assumed that layered silicates and polysaccharides as defined complement one another in their rheological activity and their swelling capacity in such a way as to be able together to stabilize even relatively large pigments, such as effect particles. If not all of the components are present, and if a member of one of the specified classes is missing, the advantageous effect does not come about.

The present invention concerns an aqueous pigmented ink. An ink here refers to an aqueous composition which comprises particulate ingredients in suspension in an aqueous medium. More particularly an ink is a composition which comprises colouring agents in the aqueous medium, examples being finely divided and/or relatively coarse pigment particles and also, optionally, soluble dyes. The aqueous ink of the invention serves for use in a capillary reservoir system which is part of an application device—a pen, for example. Capillary reservoir systems for writing, drawing, painting and printing devices are known. A capillary reservoir system suitable for such devices comprises a container for holding the liquid, this container being closed off from the atmosphere, and an applicator element which is connected to the container via a liquid line and which may, according to the nature of the device, be a writing, drawing, painting or printing applicator device. A capillary reservoir serves to store the ink and to deliver it at the desired time and in the desired amount via the applicator device. Suitable capillary reservoirs are devices which comprise porous, fibre-like material, comprising interconnected cavities which preferably have a flow travel direction, generally in the longitudinal direction of the reservoir. Fibre-like materials suitable for capillary reservoirs are well-known to the skilled person. Examples that may be given include specific polyester, polyamide or cellulose acetate fibres, surrounded by a cylindrical film which serves as a jacket and hence to prevent leakage.

A capillary reservoir is impregnated with the ink, which it takes up into the interior cavities. When the applicator device makes contact with a surface, ink flows out via the applicator device, and ink which flows out of the capillary reservoir system is delivered anew. Because of the very small cavities and channels for transporting the liquid, known, pigment-containing preparations, especially inks comprising effect pigments, have to date not been well suited to such reservoirs. Even if the particles are milled to a smaller size, there is often reagglomeration, which may cause clogging of the capillary reservoir. To date, therefore, in the field of pens, especially cosmetic pens, capillary reservoir systems have often been used only for an ink containing soluble dyes.

In connection with the present invention, a capillary reservoir system refers to any system which is able to store ink for delivery for an application in a device with capillaries. The aqueous pigmented ink of the invention is particularly suitable for use in a capillary reservoir system which is used for pens, especially cosmetic pens.

The aqueous pigmented ink of the invention is suitable for a capillary reservoir system on account of its high stability and at the same time its sufficient fluidity, which is achieved as a result of its specific composition. Besides pigments and a water-dispersible, film-forming component, therefore, the ink of the invention must comprise at least one suspension substance and at least two gel formers in order to hold pigments durably in suspension. The individual constituents are described with greater precision below.

The ink of the invention comprises at least one water-dispersible, film-forming component, which leads on application to the formation of a stable film, in the form of a line, for example. The purpose of the film-forming component is to leave a film on the application surface after application, through the drying of the volatile substances. It is desirable for the film that is left to be water-resistant and smearproof. When the ink is being used for cosmetic purposes, furthermore, it is desirable for the film formed not to run on contact with fatty substances, as may be present on the skin, for example. Film-forming polymers suitable for such use are known per se. To increase not only the water resistance and smearproofness but also the fat resistance and runproof nature of such films, it may be useful to use a mixture of film-forming components. In one embodiment the water-dispersible, film-forming component used for the ink of the invention comprises a compound or mixture of compounds which after drying leaves a durable film at the site of application. Moreover, the film which is formed serves to stabilize and to protect the colour and effect substances, such as pigments, including effect pigments, at the site of application. The film is intended, furthermore, to prevent colour and/or effect substances from transferring or from migrating from the site of application. Suitable film-forming components which are not water-soluble but are water-dispersible are sufficiently well-known both from the writing implements industry and from cosmetology, and the film formers which are commonly known can also be used for the purposes of the present invention.

Suitable water-dispersible, film-forming components are available commercially. Suitability is possessed, for example, by acrylate-based polymers such as polyacrylates, polyurethanes, polyvinyl acetates, polyesters, and also mixtures and derivatives of the stated polymers, and copolymers and block copolymers thereof. Use may also be made of mixtures of the stated polymers, copolymers and/or block copolymers. Preferred film-forming components comprise polyacrylates and/or polyurethanes and their mixtures and copolymers. Having proved to be particularly suitable are styrene/acrylates/ammonium methacrylate copolymer, polyurethane copolymers and acrylate/octylacrylamide copolymers, since they also increase the water resistance of the film as it forms. Water-dispersible components which are suitable for the ink of the invention may be easily distinguished from water-soluble film formers, which are less suitable for the ink of the invention, since water-dispersible components do not form clear solutions, whereas water-soluble components do so. Products of the kind commonly available commercially are present in the form of aqueous dispersions, containing in dispersed form the film former as finely divided droplets or particles in the aqueous phase, particularly water.

The selection of a suitable film former or film former mixture in each case may be made easily by means of routine experiments. It is essential that the film former or formers are compatible with the other ingredients of the ink and produce, at the concentration used, an ink which is flowable through capillaries. It has been found that sufficient film forming is possible if the film former is included in an amount of about 0.5 to about 15 wt % in the ink, this amount being based on the entirety of the film formers used. The particular optimum amount is guided by the nature of the particular polymers used and by their compatibility with the other constituents. An amount of less than 0.5 wt % is generally not sufficient to form a uniform and durable film. If the amount of film former is above about 15 wt %, then dispersibility and fluidity are frequently no longer sufficient. The above quantities are based in each case on the amount of polymer which is used. Water-dispersible, film-forming components are typically provided in the form of aqueous dispersions. Such aqueous dispersions have in general a polymer fraction in the range from 30 to 50 wt %. The amounts of polymer specified in this patent application pertain to the pure polymer, unless the context dictates otherwise. To produce the ink of the invention, the film former may be added either as the pure substance or as a ready-formed aqueous dispersion.

Good results are achieved with a fraction of film former in the aqueous ink in the range from 2 to 13 wt %, preferably 5 to 12 wt % (in each case weight of polymer based on the completed ink).

As mentioned above, either one film-forming polymer or a combination of film-forming polymers may be used. The quantity figure is based on the total amount of film formers used for the ink.

An essential ingredient of the ink of the invention is at least one suspension substance. It has been found that at least one suspension substance is needed in order to keep particles, especially relatively large particles, in dispersion over a longer time. A suspension substance is understood to be a substance which, insoluble in the vehicle medium, is held in suspension on account of its low size, its low density and/or its low specific gravity. Examples of suspension substances are finely divided solids, both mineral and organic, whose density is low and/or is in the region of the density of the vehicle medium. A suspension substance typically has a very small particle size, in the range between 0.005 and 10 μm. Both organic and inorganic suspension substances are suitable for stabilizing the ink of the present invention. Examples are fine powders of natural products, such as fibres, wood and nut shells, synthetic products, such as fine polymer particles having a sufficiently high softening temperature, examples being PMMA or styrene/acrylate copolymer, and inorganic products, such as glass fibres, mineral powders or ceramic powders, for example kaolin, and, in particular, silicon dioxide-based materials, such as siliceous earth, silica powder, kieselguhr in amorphous or semicrystalline form. For the ink of the invention it is also possible to use a combination of suspension substances, in which case the suspension substances may be made of different material and/or may have different sizes. Thus, for example, mixtures of organic and inorganic suspension substances, mixtures of different silicon dioxide-based materials or mixtures of silica products with different particle sizes can be used. Silica is well-suited, with silica referring to silicon dioxide-based products, especially powders. Examples are silicic acids, silica gels or aerogels having primary-grain particle sizes of up to 100 nm, examples being fumed silicas having a particle diameter in the range of from 5 to 50 nm and a specific surface area of 50 to 600 m²/g, preferably 100 to 500 m²/g, the specific surface area being determined by the BET method. Fumed silica is available commercially, for example, under the name "Aerosil".

The fraction of suspension substances in the ink of the invention is critical, since suspension substances influence the fluidity and so too high a fraction of suspension substances means that the ink is unable to flow in capillary reservoir systems. The fraction of suspension substances in the ink of the invention ought therefore to be in a range of about 0.5 and about 4.5 wt % (amount of all suspension substances, based on the completed ink). If the fraction of suspension substance/s is less than about 0.5 wt %, the stabilization may not be sufficient. If a fraction of more than about 4.5 wt % of suspension substance/s is used, ink flow may be adversely affected.

It has been found that fumed silica is especially suitable for holding pigments and film formers durably in suspension, when it is combined with the gel former combination of the invention.

A further important constituent of the ink of the invention is therefore a gel former combination. It has been found that the presence of one or more suspension substances alone is unable to keep pigments, especially effect pigments, in durable dispersion. Without being tied to any theory, it is assumed that the durable dispersing of relatively large particles requires a relatively substantial structure, which cannot be formed by suspension substances alone, but to which gel formers as well must make a contribution. It is essential, moreover, that both suspension substances and gel formers must be compatible not only with the particles to be held in dispersion but also with the dispersed, film-forming component. Not every gel former, therefore, is suitable for the ink of the invention. Various gel formers have been tested, and it has been found that very good results can be achieved when the gel former combination includes at least one mineral gel former and at least one organic thickener.

It has emerged that an essential constituent of the gel former combination is at least one mineral gel former. Mineral gel formers are known. It has proved to be advantageous if at least one mineral gel former is a swellable layered silicate. Swellable layered silicates are able to accommodate water between their layers, causing them to swell and to contribute to stability in aqueous solution. Layered silicates which are not swellable, such as kaolin, are therefore unable to contribute to the effect which is important in the invention. Swellable layered silicates are well-known and are available commercially, being those layered silicates which are able to bind water, and which frequently in so doing change their structure—in the case of phyllo-silicates, for example, an increased distance can be observed between the individual layers. Examples of swellable layered silicates are phyllosilicates and derivatives thereof, such as hectorite and its derivatives, e.g. quaternium 18 hectorites, bentonites, smectites, montmorillonites, and their respective derivatives. Mixtures of layered silicates may also be used. Although layered silicates are very suitable for forming gels and are compatible with effect pigments, it has emerged that, when they are used as sole gel formers, the fraction that would be needed for pigment stabilization is too high, and would then create rheological problems.

For stabilization, therefore, it is necessary to add an organic thickener. Organic thickeners are known and are available commercially. It has proved to be advantageous if at least one organic thickener in the gel former combination comprises a polysaccharide having thickening properties, as a second kind of gel former. The "thickening polysaccha-rides" kind is well-known per se and is frequently used in the production of cosmetics and comestibles. Polysaccharides having thickening properties are linear or branched macro-molecules, which are constructed of sugar units and are able to interact with one another through intermolecular interactions, such as hydrogen bonds, Van der Waals relationships or ionic relationships, and so are able to bind water and provide structure. These interactions and the water binding lead to an increase in the viscosity. Examples of such polysaccharides are xanthan gum, carob gum, starch, cellu-lose, and also derivatives and variants thereof, and mixtures of these polysaccharides. Cellulose and derivatives thereof are especially suitable when they are water-compatible/swellable; examples thereof are hydroxypropylcellulose, carboxymethylcellulose and sodium carboxymethylcellu-lose. Cellulose derivatives which are non-soluble and/or have little or no water compatibility, and which do not change their structure in the presence of water, are generally not suitable for use as a thickening polysaccharide, since they lack the thickening property because of insufficient water uptake. In the text below, the term "hectorite" is intended to embrace derivatives and variants of hectorite as well, the term "xanthan gum" to embrace derivatives and variants of xanthan gum as well, the term "cellulose" to embrace derivatives and variants of cellulose as well, the term "starch" to embrace derivatives and variants of starch as well, etc. Derivatives and variants include hydrolyzed polysaccharides, etherified and/or esterified polysaccharides, crosslinked products, etc., except where the context dictates otherwise.

The organic thickener may be xanthan gum and/or cellulose, or in each case a derivative and/or a variant, and also a mixture thereof. In the text below, the term "cellulose", when used in this description, in each case also includes cellulose derivatives and cellulose variants or mixtures thereof, for example cellulose esters and cellulose ethers, except where the context suggests otherwise. The term "xanthan gum" as used in this description also includes derivatives and variants of xanthan gum and mixtures, for example a mixture of xanthan and carob gum, unless the context suggests otherwise.

It has been found that a composition which features a gel former combination which comprises at least one member from each of the two groups—mineral gel formers and organic thickeners—has advantageous properties. Two or more members from each of the two groups may also be included. The total amount of gel former and of thickener must not be above the amounts defined in more detail below, since otherwise the fluidity and settleability could be adversely affected. For example, one mineral gel former and one organic thickener may be combined, or one mineral gel former and two organic thickeners. It is possible accordingly, for example, to combine cellulose, and therefore cellulose and/or a cellulose derivative and/or a cellulose variant or a mixture, and/or xanthan gum or a xanthan gum derivative or a xanthan gum variant or a mixture, together with hectorite or a hectorite derivative or a hectorite variant. The three gel formers cellulose, hectorite and xanthan gum are preferably present in the gel former combination. Surprisingly, it proves possible, specifically with at least one mineral gel former, at least one organic thickener and at least one suspension substance, to form a network or a structure which is able to carry and to hold in suspension not only small-particle pigments, but also lamellar, flake-like, spherical or alternatively formed effect pigments. It was indeed already known that polysaccharides such as cellulose, for example, could be used as a filler for inks as well. However, it was not possible to provide effect pigments with sufficient stabilization solely with a polysaccharide in combination with a suspension substance. Only if a gel former combination having at least two components as defined is present and is combined with a suspension substance is it possible to achieve the desired results, as shown in the subsequent examples.

The amount of gel former combination must not be too low, since otherwise no effect is obtained, and on the other hand it must not be too high, since otherwise the fluidity of the ink is negatively influenced. It has been found that an amount of gel former combination in the range from about 0.01 to about 0.25 wt % is able to achieve the desired purpose. Good results are obtained if the fraction of the gel former combination in the completed ink is in a range from about 0.05 to 0.15 wt %. This quantity is based on the entirety of gel formers present in the ink. The gel former combination used in the invention may consist of two or more gel formers, with at least two of the gel formers being selected from the group identified above. If more than two gel formers are used, then both the third component of the above-stated group and also one or more additional gel formers may be included. Very good results are obtained if the ink comprises hectorite, xanthan gum and cellulose. The fraction of the gel formers present may vary, provided that the total amount of gel former is between 0.01 and 0.25 wt %. If two of the gel formers from the above-stated group are used, then they may be present, for example, in a ratio of 0.8-1.2:1.2-0.8. If all three gel formers are used, they may be present, for example, in a ratio of 0.8-1.2:0.8-1.2:0.8-1.2. Very good results have been obtained if the three gel formers of the group are used in approximately the same fractions, such as in a ratio of about 1:about 1:about 1, e.g. 1:1:1.

A further essential constituent of the ink of the invention are the colouring constituents, more particularly pigments, including effect pigments. The selection of the colourants is made preferably such that the use thereof and the amount used meet the stipulations for cosmetics in the consumer countries, such as the EU, and on the other hand generate the desired shade.

The stabilizing combination of suspension substances and gel formers, according to the invention, is suitable for all known pigments, and develops its advantageous properties for the stabilization of pigments having a size of more than 1 μm, especially for stabilizing effect pigments having a particle size of 5 to 100 μm, for example 10 to 50 μm, and is therefore employed preferentially for those inks which comprise at least one effect pigment, without any problems with the fluidity occurring. The particle size may be determined in a customary way, for example using laser diffraction methods, as defined in ISO 13320. Instruments suitable for determining particle size include a Microtrac instrument available commercially as the Bluewave S 3500 model.

Effect pigments here are those constituents which in a composition, as well as the colouring, contribute other visual and/or aesthetic effects, such as gloss, glitter, structure, for example, and/or those constituents whose optical effect is achieved not by absorption of certain wavelengths of light, as in the case of dyes, but instead by reflection, for example metal particles, or by interference at transparent layers, for example pearlescent pigments, or by a combination thereof, for example pigments which exhibit different shades or colours depending on the angle of viewing. Examples of known effect pigments include glitter agents, such as substances based on coated mica, synthetic or natural mica, with or without coating or some other functionalization, phlogopites, such as synthetic fluorphlogopite, bismuth oxychloride, coated bismuth oxychloride, glass, platelet-shaped metal powders at least partly coated with other materials, finely divided polymeric platelets at least partly coated with other materials, such as PET platelets, or solid solutions of dyes in suitable polymeric matrices, such as polyester-3, for example. Although these substances identified as effect pigments have a size and external shape which are not conducive to their fluidity, with flakes or platelets being examples, the ink of the invention allows these effect agents to be suspended in such a way that they are able nevertheless to flow through capillary reservoir systems. Without being tied to any theory, it is assumed that gel former combinations and suspension substance build up a structure which is able to accommodate the effect agents in a form such that the resulting structure can glide through the capillary. With the combination according to the invention, therefore, effect pigments or effect agents having a particle size of more than 5 μm and up to 100 μm, e.g. 10 to 50 μm, as may be present in the case of pearlescent pigments, can be stabilized in suspension.

For the ink of the invention, apart from effect pigments or in addition to effect pigments, the pigments commonly used can be employed in finely ground form, i.e. in a particle size which is able to pass through the capillary openings of capillary reservoirs. Typically these are particle sizes below 1 μm, especially <0.2 μm. Pigments are understood very generally to be white or coloured, organic or inorganic particles which in particular are insoluble in water or in the medium of use and which are intended to give the composition colour and/or turbidity.

Pigments suitable for use in cosmetic preparations and everyday articles are well-known. Of the colourants suitable for the ink of the invention, examples that may be given include pigments such as titanium dioxide (C.I. No. 77891), iron oxides (C.I. No. 77491, 77492, 77499), ultramarine (C.I. No. 77007), Prussian blue/Ferric blue (C.I. No. 77510), carbon blacks (C.I. No. 77267) chromium oxide green (C.I. No. 77288), chromium oxide hydrate green (C.I. No. 77289), manganese violet (C.I. No. 77742), zinc oxide (C.I. No. 77947), barium sulfate (C.I. No. 77120), glitter agents such as mica, at least partly coated with titanium dioxide (C.I. No. 77891) and/or with other metal oxides, such as iron oxides, chromium oxide green or chromium oxide hydrate green, or with ultramarine, and similar colourants, bismuth oxychloride and mixtures thereof with mica (C.I. No. 77163), at least partly coated with titanium dioxide and/or with other of the aforementioned metal oxides or other colourants, platelet-shaped, optionally finely divided metal powders such as, for example, aluminium (C.I. No. 77000), copper (C.I. No. 77400), bronze (C.I. No. 77400), brass (C.I. No. 77400), silver (C.I. No. 77820) or gold (C.I. No. 77480). Organic colourants are advantageously selected from the complex salts of carminic acid (C.I. No. 75470) and/or colourants selected from the fluoresceins, monoazo dyes, disazo dyes, indigotin dyes, pyrazole dyes, quinoline dyes, triphenylmethane dyes, anthraquinone dyes and xanthan dyes, which have been rendered insoluble in a suitable way by laking. Examples here would include FD&C Red No. 3 (C.I. No. 45430), D&C Red No. 6 (C.I. No. 15850), D&C Red No. 7 (C.I. No. 15850:1), D&C Red No. 21 (C.I. No. 45380:2), D&C Red No. 22 (C.I. No. 45380), D&C Red 27 (C.I. No. 45410:1), D&C Red 28 (C.I. No. 45410), D&C Red 30 (C.I. No. 73630), D&C Red No. 33 (C.I. No. 17200), D&C Red No. 34 (C.I. No. 15880:1), FD&C Yellow No. 5 (C.I. No. 19140), FD&C No. 7 (C.I. No. 45350:1), D&C Yellow No. 10 (C.I. No. 47005), D&C Orange No. 5 (C.I. No. 45370:1), D&C Orange No. 10 (C.I. No. 45425:1), FD&C Green No. 3 (C.I. No. 42053), D&C Green No. 5 (C.I. No. 61570), D&C Green No. 6 (C.I. No. 61565), FD&C Blue No. 1 (C.I. No. 42090), D&C Violet No. 2 (C.I. No. 60725). Further suitable colourants include, as pigments, boron nitrides, and both platelet-shaped and spherical polymer particles and silica particles, which in turn may be coated or combined with the aforementioned pigments and are known to the skilled person under the term, for example, of "light diffusing pigments" (LDPs). Particularly preferred pigments are selected from iron oxides, titanium dioxide, zinc oxide, carbon black, carmine, ferric ferrocyanide, chromium hydroxide green, chromium oxide green, manganese violet, ultramarine blue and Yellow 5, since these permit particularly effective colour coverage and the production of the majority of combination colours.

The amount of pigments in the ink of the invention may be selected according to the colouring properties of the pigment selected and the desired colour intensity. To tint the ink of the invention it is possible to use either one pigment or a mixture of pigments, a mixture of pigments and effect pigments, or a mixture of pigments, effect pigments and soluble colourants. The amount of pigment is based on all of the colourants present in the ink, i.e. pigments, effect pigments and soluble dyes. The range of use is very broad, since amounts of a few percent by weight or parts thereof, for example less than 1 wt %, can be used for slight colour shading, whereas for very intensely coloured tints and/or tints with strong effects it is possible to contemplate a pigment fraction of up to 20 wt % and above. The upper limit is imposed by the fluidity of the ink—in other words the fraction of pigment must not be so high that the fluidity of the ink in the capillary reservoir is adversely affected. An adverse effect on fluidity becomes a risk when the amount reaches more than 20 wt %. The percentages here are based in each case on the weight of the completed ink. The amount of pigment in the ink of the invention is suitably about 5 to about 15 wt %, preferably about 7 to about 12 wt %. With 7 to 12 wt % of pigment it is possible to obtain effectively hiding, intensely coloured inks which are sufficiently fluid and therefore remain stabilized for a long time and consequently are very suitable for the writing implements industry and in cosmetology.

The ink of the invention may comprise further ingredients of the kind customary for such products, such as humectants, preservatives, fragrances, etc., and may also comprise one or more surfactants, in the customary amounts known to the skilled person in each case.

The ink of the invention may comprise a humectant. Examples of suitable humectants include monohydric and polyhydric alcohols, urea derivatives and plant extracts, with propylene glycol, methylpropanediol and butylene glycol being highly suitable since they are highly compatible with the other ingredients of the ink and hence do not destabilize the ink.

The ink of the invention is adequately stabilized by the ingredients described above, and so there is not an absolute need to use surfactants. It is, though, possible to add surfactants in order to lower the surface tension of the water phase and to achieve better spreading of the ink over the area of application. Suitable surfactants may be selected by the skilled person from commercial surfactants, used generally in the area of writing implements and cosmetics. The amounts of the commercial raw materials may be determined easily by the skilled person by means of routine experiments.

The fragrances and preservatives used typically in the writing implements and cosmetics industries are also suitable for the ink of the invention and may, if desired, be used in the customary amounts.

The ink of the invention is suitable for any kind of writing implements with a capillary reservoir system. It can therefore be used for corresponding pens with capillary reservoir systems and for cosmetic pens with capillary reservoir systems. Examples are blusher, eyeliner, lip tint, lip liner, eyeshadow, mascara or eyebrow tint.

Also a subject of the invention, therefore, is a pen which has a capillary reservoir system and which contains an aqueous pigmented ink, as described above. The present invention also relates more particularly to a cosmetic pen which has a capillary reservoir system and which contains an aqueous pigmented ink as described above.

Pens with a capillary reservoir system are more complex to produce than simple ballpoint pens. For such pens it is useful to provide replenishment. Another subject of the invention, therefore, is a refill container for a pen based on capillary reservoir system, the refill container comprising a container with aqueous pigmented ink stored therein.

The invention thus provides an ink which on the basis of its good rheological and aesthetic properties is eminently suitable for use in pens having capillary reservoir systems. The good properties are achieved through the combination of a suspension substance with a gel former combination which is compatible with the other ingredients of the ink, such as film formers and colourants, and which exerts a stabilizing effect on all particulate ingredients, the stabilizing effect being retained even at elevated temperatures, e.g. at temperatures of 45° C. and more. This ink can therefore be used for pens which are also used in locations showing particular climatic conditions, such as in southern countries, for example. This stability makes it easier to produce, transport, store and use the ink of the invention.

The invention is further illustrated by the examples which follow.

EXAMPLE 1

An aqueous ink was produced which contained as gel formers xanthan gum, hectorite and cellulose, as film former an aqueous dispersion of styrene/acrylates/ammonium methacrylate copolymer, as pigment mica 77019 and the iron oxides 77491/77492/77499. The ink also contained commonly used ingredients, such as surfactants, namely poloxamer 407, coco-glucosides and water, and also ethyl-hexylglycerol and tocopherol, phenoxyethanol and potassium sorbate as a preservative system, and additionally citric acid to establish the pH, which is established suitably in a range from about 5.5 to 6.5, i.e. slightly acidic. The pH of the ink of the invention is not critical; the stabilizer system of the invention, composed of suspension substances and gel formers, is stable from acid to basic. As the skilled person is aware, it may be advantageous when using acrylates to establish a slightly basic or slightly acidic environment and to not allow the environment to become more strongly acidic, in order to prevent any change in the solubility. The skilled person is able to determine the most suitable pH range in each case, by routine experiments. For experiments, this ink was admixed with varying amounts of silica as suspension substance, with the water content being adapted accordingly in each case (ad 100). The formula is shown in Table 1 below.

TABLE 1

| Ingredient | Amount (parts by weight) |
| --- | --- |
| Methylpropanediol | 2.375 |
| Butylene glycol | 8 |
| Xanthan gum + hectorite + cellulose 1:1:1 | 0.1 |
| Poloxamer 407 | 2 |
| Coco-glucosides | 1.5 |
| Styrene/acrylates/ammonium methacrylate copolymer (40% aqueous dispersion) | 25 |
| Pigment (mica 77019, iron oxides 77491, 77492, 77499)* | 10 |
| Ethylhexylglycerol + tocopherol | 0.1 |
| Phenoxyethanol | 0.6 |
| Potassium sorbate | 0.475 |

TABLE 1-continued

| Ingredient | Amount (parts by weight) |
| --- | --- |
| Citric acid | 1.0 |
| Aqua dest. | ad 100 |

*Proportions according to desired shade

An aqueous ink was produced from the ingredients specified in Table 1. This ink was the base material for a series of test inks, each of which was admixed with different fractions of Aerosil fumed silica. The inks were then tested in a capillary writing system for their stability and fluidity. It was found that in the case of a comparative ink containing no suspension substance, the effect pigments underwent severe settlement and the ink was no longer writable after a short time.

The surprising effect of the addition of just about one percent by weight of suspension substance was a considerable improvement in both the stability and the fluidity. A fraction below 1 wt % was generally not enough to obtain the stability. A fraction of more than 3 wt %, problems with the fluidity were possible. An ink with 2 wt % of silica gave optimum properties.

EXAMPLE 2

An aqueous ink was produced which contained as suspension substance silica, as film former an aqueous dispersion of styrene/acrylates/ammonium methacrylate copolymer, as pigment mica 77019 and the iron oxides 77491/77492/77499. The ink also contained commonly used ingredients, such as surfactants, namely poloxamer 407, coco-glucosides and water, and also ethylhexylglycerol and tocopherol, phenoxyethanol and potassium sorbate as a preservative system, and additionally citric acid to establish the pH. For experiments, this ink was admixed with varying amounts of the gel formers xanthan gum, hectorite and cellulose, with the water content being adapted accordingly in each case (ad 100). The formula is shown in Table 2 below.

TABLE 2

| Ingredient | Amount (parts by weight) |
| --- | --- |
| Methylpropanediol | 2.375 |
| Butylene glycol | 8 |
| Silica | 2 |
| Poloxamer 407 | 2 |
| Coco-glucosides | 1.5 |
| Styrene/acrylates/ammonium methacrylate copolymer (40% aqueous dispersion) | 25 |
| Pigment (mica CI 77019, iron oxides 77491, 77492, 77499)* | 10 |
| Ethylhexylglycerol + tocopherol | 0.1 |
| Phenoxyethanol | 0.6 |
| Potassium sorbate | 0.475 |
| Citric acid | 1.0 |
| Aqua dest. | ad 100 |

*Proportions according to desired shade

An aqueous ink was produced from the ingredients specified in Table 2. This ink without gel former was then tested in a capillary writing system for its stability and fluidity. It was found that the pigments underwent severe settlement and the ink after a short time was no longer writable.

The ink was then admixed with different fractions of gel former combination (hectorite+xanthan gum+cellulose 1:1:

1) and the influence thereof on the rheological behaviour of the ink, and the effect on the settlement stability and the ink flow in a capillary system, were investigated. It was found that for an addition of just about 0.05 wt %, an ink was obtained which had good ink flow and no settlement of pigments.

The results are summarized in Table 3, with the meaning of the symbols being as follows:

+ no or virtually no settlement of pigments, good ink flow 0 settlement of pigments and/or inadequate ink flow − severe settlement of pigments and/or poor ink flow nd not determined

TABLE 3

| Fraction of silica** | Fraction of rheological additives (hectorite + xanthan gum + cellulose 1:1:1)** | | | | |
|---|---|---|---|---|---|
| | 0 | 0.05 | 0.1 | 0.15 | 0.2 |
| 0 | − | − | − | − | − |
| 1 | − | − | − | − | 0 |
| 1.5 | − | − | − | − | 0 |
| 2 | − | − | + | + | + |
| 2.5 | − | 0 | + | 0 | − |
| 3 | − | + | 0 | − | nd |

**in each case in wt %

The data in Table 3 shows that the amounts of rheological additives and silica added to an ink are very critical. Only if the fraction of suspension substance and the amount of rheological additives are harmonized with one another in accordance with the invention is an ink obtained wherein the pigments show little or no settlement and the ink flow is such as to allow the ink to be used for a capillary reservoir system.

It was found that the amount of suspension substance must not be higher than 4.5 wt % and that the gel former component is able to furnish the desired results only in very small fractions of about 0.05 to about 0.5 wt %. If suspension substances and/or gel formers are used outside the claimed limits, then in general either the settlement behaviour of the pigments or the fluidity of the ink, or both, is or are adversely affected, as shown by the experiments in Table 3.

EXAMPLE 3

An investigation looked at whether an acrylate copolymer makes a suitable organic thickener. Accordingly, a comparative ink was produced in accordance with Table 2, and was admixed with an acrylate copolymer as stabilizer, instead of the gel former combination of the invention. It emerged that the ink did indeed have a similar viscosity and a comparable flow behaviour to the inks described in Example 2. Nevertheless, the sample with the acrylate copolymer showed greater sedimentation of the pigments and therefore a much poorer ink flow in the capillary reservoir system. It was further found that the properties, because of the acrylate fraction, were heavily dependent on the pH of the composition.

In contrast, very good results were obtained when the ink as per the formula in Table 2 was admixed with a mixture of xanthan gum, hectorite and cellulose. In this case both the stability of the pigments and the flow behaviour in the capillary reservoir system were excellent.

The results are summarized in Table 4 below.

TABLE 4

| Stabilizing component | Viscosity η (mPas)*** | Observations |
|---|---|---|
| 1% silica + 1% acrylates copolymer | 100 | Severe settlement of pigments |
| 1% silica + 2% acrylates copolymer | 200 | Settlement of pigments |
| 1% silica + 3% acrylates copolymer | 450 | Stable to settling (in bulk), but virtually no ink flow in the capillary system |
| 1% silica + 0.05% xanthan gum | 180 | Slight settlement of pigments, limited ink flow in the capillary system |
| 1% silica + 0.1% xanthan gum | 460 | Stable to settlement (in bulk), no ink flow in the capillary system |
| 1% silica + 0.1% acrylates/ C10-30 alkyl acrylate crosspolymer | 800 | Settlement of pigments |
| 1% silica + 0.1% K-carrageenan | 80 | Slight settlement of pigments, good ink flow in the capillary system, not temperature-stable |
| 1% silica + 0.03% xanthan gum + 0.03% hectorite + 0.03% cellulose | 100 | Stable to settling (in bulk), good ink flow in capillary system |

***measured with a Physica MCR 301 rheometer at 25° C. and a shear rate of 1 s$^{-1}$

EXAMPLE 4

A further investigation looked at whether the addition of xanthan gum as sole gel former is sufficient to obtain the desired properties. A comparative ink was produced as per Table 2 with 2% of silica (Aerosil, available commercially from Evonik), to which 0.1% of xanthan gum was added as stabilizer. This ink in fact had the lowest viscosity, and the pigments were also virtually stable to settling in the reservoir vessel. When, however, this ink was used in a capillary reservoir system, it exhibited poor flow behaviour. This ink was therefore not suitable for the intended purpose.

Further comparative experiments were carried out with inks having an effect agent fraction of 10% and a suspension substance content of 2% of fumed silica. Flow curves were recorded, and are shown in FIG. 1.

Although the inks have similar viscosities and a comparable flow behaviour in the rheogram, the sample with 0.3% of acrylate copolymer as rheological additive (plot with squares) exhibits poor ink flow in the pen system and significant sedimentation of the pigments in the ink. Ink quality, moreover, is heavily dependent on the pH of the composition. The ink with 0.1% of xanthan gum (plot with circles) shows the lowest viscosity in the rheogram, and the pigments are virtually stable to settling in bulk. In the pen system, nevertheless, this ink exhibits the poorest flow behaviour. Very good results in terms of pigment stability and flow behaviour in the pen are exhibited by inks containing 0.1% and 0.2% of a mixture of xanthan, hectorite and cellulose (plots with triangles and diamonds).

What is claimed is:

1. An aqueous pigmented ink, the aqueous pigmented ink comprising:

at least one pigment, at least one water-dispersible film-forming component, at least one suspension substance in an amount of 0.5-4.5 wt % of the aqueous pigmented ink, wherein the at least one suspension substance is fumed silica, and a gel former combination in an aqueous vehicle, wherein the gel former combination is present in an amount of 0.01-0.5 wt % of the aqueous pigmented ink and the gel former combination comprises hectorite, xanthan gum, and cellulose in a weight ratio of 1:1:1, wherein the at least one pigment is suspended in the at least one suspension substance and the gel former combination.

2. The aqueous pigmented ink of claim 1, wherein the water-dispersible film-forming component comprises at least one acrylate-based film former.

3. The aqueous pigmented ink of claim 1, wherein the at least one pigment comprises at least one effect pigment having a particle size of 5 μm to 100 μm.

4. The aqueous pigmented ink of claim 1, wherein the at least one pigment comprises at least one effect pigment selected from the group consisting of flakes, pearl pigment, borosilicate, phlogopite, and combinations thereof.

5. A pen comprising a capillary reservoir system and an aqueous pigmented ink, the aqueous pigmented ink comprising:

at least one pigment, at least one water-dispersible film-forming component, at least one suspension substance in an amount of 0.5-4.5 wt % of the aqueous pigmented ink, wherein the at least one suspension substance is fumed silica, and a gel former combination in an aqueous vehicle, wherein the gel former combination is present in an amount of 0.01-0.5 wt % of the aqueous pigmented ink and the gel former combination comprises hectorite, xanthan gum, and cellulose in a weight ratio of 1:1:1, wherein the at least one pigment is suspended in the at least one suspension substance and the gel former combination.

6. A refill container for a pen, the refill container comprising a reservoir and an aqueous pigmented ink, the aqueous pigmented ink comprising:

at least one pigment, at least one water-dispersible film-forming component, at least one suspension substance in an amount of 0.5-4.5 wt % of the aqueous pigmented ink, wherein the at least one suspension substance is fumed silica, and a gel former combination in an aqueous vehicle, wherein the gel former combination is present in an amount of 0.01-0.5 wt % of the aqueous pigmented ink and the gel former combination comprises hectorite, xanthan gum, and cellulose in a weight ratio of 1:1:1, wherein the at least one pigment is suspended in the at least one suspension substance and the gel former combination.

7. The pen of claim 5, wherein the pen is a cosmetic pen.

8. The pen of claim 5, wherein the aqueous pigmented ink is disposed within the capillary reservoir system.

9. The pen of claim 5, wherein the capillary reservoir system comprises a reservoir containing the aqueous pigmented ink and an applicator in fluid connection with the reservoir.

10. The refill container of claim 6, wherein the aqueous pigmented ink is disposed within the reservoir.

11. The refill container of claim 6, wherein the pen comprises an applicator, and wherein the refill container is configured to be in fluid connection with the applicator.

12. The cosmetic pen of claim 7, wherein the aqueous pigmented ink is disposed within the capillary reservoir system.

13. The cosmetic pen of claim 7, wherein the capillary reservoir system comprises a reservoir containing the aqueous pigmented ink and an applicator in fluid connection with the reservoir.

14. The aqueous pigmented ink of claim 1, wherein the at least one suspension substance comprises 1-3 wt % of the aqueous pigmented ink, and the gel former combination comprises 0.01-0.25 wt % of the aqueous pigmented ink.

15. The pen of claim 5, wherein the at least one suspension substance comprises 1-3 wt % of the aqueous pigmented ink, and the gel former combination comprises 0.01-0.25 wt % of the aqueous pigmented ink.

16. The refill container of claim 6, wherein the at least one suspension substance comprises 1-3 wt % of the aqueous pigmented ink, and the gel former combination comprises 0.01-0.25 wt % of the aqueous pigmented ink.

17. The aqueous pigmented ink of claim 1, wherein the at least one pigment comprises a flake-like effect pigment.

* * * * *